2,881,172
CHEMICAL COMPOUNDS

Arthur W. Weston, Waukegan Township, Lake County, Ill., assignor to Abbott Laboratories, North Chicago, Ill., a corporation of Illinois No Drawing. Application September 10, 1956
Serial No. 608,657

8 Claims. (Cl. 260—268)

The present invention relates to a di-substituted piperazine compound having improved therapeutic properties and more particularly to novel di-substituted hydroxyalkyl piperazine compounds and to the method of making said compounds.

The novel substituted piperazine base of the present invention has the general formula:

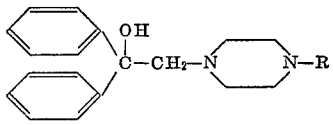

in which R is a lower alkyl group, such as methyl, ethyl, or propyl.

The following specific examples are for the purpose of illustrating the present invention and should not be considered as limiting the said invention to the particular ingredients or proportions disclosed.

EXAMPLE I

*N-(β-diphenyl-β-hydroxyethyl)-N'-methylpiperazine*

In a 2-liter, 3-necked, round-bottomed flask equipped with a stirrer, dropping funnel, and a condenser protected with a calcium chloride drying tube is placed 6.0 g. (.25 mol) of magnesium turnings and the turnings covered with anhydrous ether. A crystal of iodine is added to the flask and 39.3 g. (.25 mol) of bromobenzene dissolved in 100 cc. of anhydrous ether is added dropwise with stirring while the reaction slowly proceeds. The reaction mixture is stirred while heating on a steam bath for about one hour after the addition of the bromobenzene solution is completed and yields the Grignard reagent, phenyl magnesium bromide. The mixture is cooled to room temperature and 29.9 g. (.137 mol) of N-phenacyl-N'-methylpiperazine dissolved in 150 cc. of anhydrous toluene is added dropwise and the ether solvent evaporated. The resulting toluene mixture is stirred and refluxed for about 2½ hours. The reaction mixture is cooled and 25 g. of ammonium chloride dissolved in 100 cc. of water is added dropwise with stirring. After filtering, the toluene layer is separated and the aqueous portion extracted with ether. The ether extraction is combined with the toluene solution, and the solvents removed under reduced pressure. The residue is distilled to yield a liquid having a boiling point of 210–212° C. at a pressure of 3.9 mm. and a refractive index $n_D{}^{25}$ of 1.5731. The base N-(β-diphenyl-β-hydroxyethyl)-N'-methylpiperazine on chemical analysis is found to comprise 9.45% N as compared with a theoretical analysis of 9.46% N.

The dihydrochloride salt of the latter base was prepared by dissolving the said base in ether and treating with an excess of ethanolhydrogen chloride whereupon the dihydrochloride salt precipitates as a crystalline salt which on recrystallization from ethyl alcohol and methanol yields a purified salt having a melting point of 224–225° C.

EXAMPLE II

*N-(β-phenyl-β-hydroxy-β-phenylethyl)-N'-methylpiperazine methosulfate*

To 2.97 g. (.01 mol) of the base obtained in Example I dissolved in ether is added 1.26 g. (.01 mol) of dimethyl sulfate. The methosulfate quaternary ammonium salt of the said base precipitates immediately as a crystalline solid. The said quaternary salt is filtered and recrystallized twice from a methanol-ether solvent to yield the purified salt having a melting point of 160–162° C. The latter quaternary ammonium salt on chemical analysis is found to have 59.40% C, 7.21% H, 6.81% N as compared with a theoretical analysis of 59.69% C, 7.18% H, 6.63% N.

EXAMPLE III

*N-(β(p-chlorophenyl)-β-phenyl-β-hydroxyethyl)-N'-methylpiperazine*

In a 2-liter, 3-necked, round-bottomed flask equipped with a stirrer, dropping funnel, and condenser protected with a calcium chloride drying tube is placed 8.4 g. (.35 mol) of magnesium turnings and the magnesium covered with anhydrous ether. A crystal of iodine is added to the flask and 67 g. (.35 mol) of p-chlorobromobenzene is added dropwise with stirring while the reaction proceeds slowly. After the addition of the p-chlorobromobenzene is completed, the mixture is heated on a steam bath with stirring for about one hour. The mixture is cooled to room temperature and 42 g. (.192 mol) of N-methyl-N'-phenacylpiperazine dissolved in 150 cc. of anhydrous ether is added dropwise with stirring. The mixture is refluxed with stirring for an additional period of about 2 hours. The mixture is cooled and a solution of 25 g. of ammonium chloride in 100 cc. of water is added dropwise with stirring. The resulting ether solution is decanted from the gelatinous precipitate formed which is washed several times with ether. The ether solutions are concentrated and benzene is added thereto to remove any water which is present. The solvents are removed and the oily residue is distilled at a pressure of 0.6 mm. to yield a product having a boiling point of 188–190° C. and a refractive index of $n_D{}^{25}$ of 1.5878. The dihydrochloride salt of the foregoing base is prepared by treating the said base with one equivalent of isopropanol-hydrogen chloride. The hydrochloride salt is precipitated from solution with ether. The material is recrystallized three times from ethyl alcohol to yield a product having a melting point of 229–230° C. which on analysis is found to have 56.10% C, 6.25% H, 7.22% N as compared with a theoretical composition of the dihydrochloride salt containing 56.51% C, 6.24% H, 6.94% N.

EXAMPLE IV

*N-(β-(p-chlorophenyl)-β-phenyl-β-hydroxyethyl)-N'-methylpiperazine methiodide*

To 1.0 g. (.003 mol) of the base obtained in Example II dissolved in anhydrous ether is added one equivalent of methyl iodide in an ether solution. The quaternary salt precipitates slowly. Upon standing for a prolonged period, the salt is filtered and upon recrystallizing twice from ethyl alcohol yields the quarternary salt of N-(β-(p - chlorophenyl) - β - phenyl - β - hydroxyethyl) - N'-methylpiperazine methiodide having a melting point of 116–117° C. and is found to have 51.02% C, 5.55% H, and 5.79% N as compared with a theoretical analysis of 50.80% C, 5.54% H, 5.93% N.

EXAMPLE V

*N-(β,β-diphenyl-β-hydroxyethyl)-N'-ethylpiperazine*

In a 2-liter, 3-necked, round-bottomed flask equipped with a stirrer, dropping funnel, and a condenser protected with a calcium chloride drying tube is placed 9.6 g. (.4 mol) of magnesium turnings and the turnings covered with anhydrous ether. A crystal of iodine is added to the flask and 62.8 g. (.4 mol) of bromobenzene dissolved in 150 cc. of anhydrous ether is added dropwise with stirring while the reaction slowly proceeds. The reaction mixture is stirred while heating on the steam bath for about two hours after the addition of the bromobenzene solution is completed and yields the Grignard reagent, phenyl magnesium bromide. The mixture is cooled to room temperature and 18.6 g. (.08 mol) of N-ethyl-N'-phenacylpiperazine dissolved in 150 cc. of anhydrous ether is added dropwise and the ether solvent evaporated. The resulting ether mixture is stirred and refluxed for about 18 hours. The reaction mixture is cooled and 25 g. of ammonium chloride dissolved in 100 cc. of water is added dropwise with stirring. After filtering, the ether layer is separated and then concentrated on a steam bath with benzene being added to remove any water present. The crude base is recrystallized from petroleum solvent (Skelly B) and exhibits a melting point of 64–65° C. On chemical analysis, the said base is found to contain 77.14% C, 8.36% H and 9.03% N as compared with the theoretical analysis of 77.38% C, 8.44% H and 9.03% N.

EXAMPLE VI

*N-phenacyl-N'-methylpiperazine*

A solution of 80 g. of N-methylpiperazine dissolved in 250 cc. of anhydrous xylene is added to 42.4 g. of anhydrous sodium carbonate in a 1-liter, 3-necked, round-bottomed flask equipped with a stirrer, dropping funnel, and condenser protected with a calcium chloride drying tube. While the mixture is being stirred and refluxed a suspension of 79.6 g. of phenacyl bromide dissolved in 100 cc. of anhydrous xylene is added dropwise. The mixture is stirred and refluxed for about 16 hours. The cooled reaction mixture is extracted 3 times with dilute hydrochloric acid and the acidic extractions are made alkaline with dilute sodium hydroxide solution. The oil layer is separated, concentrated, and water is removed therefrom by the addition of benzene. The semisolid residue is fractionated to yield a solid which on recrystallizing from Skellysolve B has a melting point of 69–70° C. On analysis the product N-phenacyl-N'-methylpiperazine is found to have a nitrogen content of 12.68% as compared with a theoretical nitrogen content of 12.84%.

The dihydrochloride salt of the base is prepared by treating the said base with ether-hydrogen chloride to precipitate the dihydrochloride salt of the base and upon recrystallizing twice from methanol yields a salt having a melting point of 250–251° C. On analysis the dihydrochloride salt of N-phenacyl-N'-methylpiperazine is found to have a nitrogen content of 9.58% as compared with a theoretical nitrogen composition of 9.62%.

The acid addition salts of the compounds of the present invention are useful for treating Parkinson's disease and can be administered in the form of 100, 200, and 300 mg. tablets as prescribed by a physician.

The compositions of the present invention are generally more conveniently administered therapeutically as non-toxic salts, such as the acid addition salts, since the compositions of the present invention are usually more soluble in water as salts than as the free base, particularly when a rapid effect is desired. Any acid which produces a water-soluble salt and does not appreciably enhance the toxicity is suitable for use; such acids as sulfuric, phosphoric, hydrochloric, levulinc, mucic, acetic and tartaric acid may be used. The sparingly soluble salts, as well as the free bases, however, can be administered when the pharmacological effect desired should be slow and relatively long in duration.

This application is a continuation application of the inventor's co-pending application Serial No. 468,547, filed November 12, 1954, and now abandoned.

Others may readily adapt the invention for use under various conditions of service, by employing one or more of the novel features disclosed or equivalents thereof. As at present advised with respect to the apparent scope of my invention, I desire to claim the following subject matter.

I claim:

1. A chemical compound selected from the group consisting of di-substituted piperazine bases having the general formula:

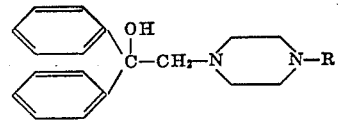

wherein R is a lower alkyl group; and the non-toxic acid addition salts of the said base.

2. The compound N-(β-diphenyl-β-hydroxyethyl)-N'-methylpiperazine.

3. The dihydrochloride salt of N-(β-diphenyl-β-hydroxyethyl)-N'-methylpiperazine.

4. The compound N-(β-phenyl-β-hydroxy-β-phenylethyl)-N'-methylpiperazine methosulfate.

5. The compound N-(β-(p-chlorophenyl)-β-phenyl-β-hydroxyethyl)-N'-methylpiperazine.

6. The dihydrochloride salt of N-(β-(p-chlorophenyl)-β-phenyl-β-hydroxyethyl)-N'-methylpiperazine.

7. The compound N-(β-(p-chlorophenyl)-β-phenyl-β-hydroxyethyl)-N'-methylpiperazine methiodide.

8. The compound N-(β,β-diphenyl-β-hydroxyethyl)-N'-ethylpiperazine.

References Cited in the file of this patent

UNITED STATES PATENTS

| | | |
|---|---|---|
| 2,680,115 | Ruddy | June 1, 1954 |
| 2,716,121 | Denton | Aug. 23, 1955 |

FOREIGN PATENTS

| | | |
|---|---|---|
| 683,950 | Great Britain | Dec. 10, 1952 |